United States Patent [19]

Mochizuki

[11] Patent Number: 5,184,528
[45] Date of Patent: Feb. 9, 1993

[54] SHIFT TIMING CONTROL FOR AUTOMATIC TRANSMISSION

[75] Inventor: Tatsufumi Mochizuki, Shizuoka, Japan

[73] Assignee: Jatco Corporation, Japan

[21] Appl. No.: 772,861

[22] Filed: Oct. 8, 1991

[30] Foreign Application Priority Data

Oct. 9, 1990 [JP] Japan .................. 2-271659
Oct. 9, 1990 [JP] Japan .................. 2-271660

[51] Int. Cl.$^5$ ............................. B60K 41/06
[52] U.S. Cl. .......................... 74/869; 74/867
[58] Field of Search .......... 74/867, 868, 869

[56] References Cited

U.S. PATENT DOCUMENTS

| | | | |
|---|---|---|---|
| 4,445,401 | 5/1984 | Ishimaru | 74/869 |
| 4,563,918 | 1/1986 | Sugano | 74/869 |
| 4,753,134 | 6/1988 | Hayasaki | 74/867 X |
| 4,843,920 | 7/1989 | Hayasaki et al. | 74/869 |
| 4,867,014 | 9/1989 | Sugano | 74/868 |
| 5,003,330 | 7/1991 | Okahara | 74/867 |
| 5,005,443 | 4/1991 | Sugano | 74/868 |
| 5,050,460 | 9/1991 | Sugano | 74/867 |

FOREIGN PATENT DOCUMENTS

58-156757 9/1983 Japan .

Primary Examiner—Leslie A. Braun
Assistant Examiner—Benjamin Levi
Attorney, Agent, or Firm—Ronald P. Kananen

[57] ABSTRACT

A shift timing control for an automatic transmission comprises a hydraulic passage having a first drain port, a first valve having a second drain port, and a second valve disposed between a low clutch release chamber and the hydraulic passage. The second valve selectivity connects the high clutch chamber with the low clutch release chamber in second gear so as to drain off hydraulic fluid within the high clutch chamber and the low clutch release chamber from the first drain port, and the low clutch release chamber with a band brake fourth gear apply chamber in third gear so as to drain off hydraulic fluid within the low clutch chamber and the band brake fourth gear apply chamber from the second drain port.

8 Claims, 4 Drawing Sheets

| | REVERSE CLUTCH | HIGH CLUTCH | LOW CLUTCH | | BAND BRAKE | | | LOW & REVERSE BRAKE | ONE-WAY CLUTCH |
|---|---|---|---|---|---|---|---|---|---|
| | | | APPLY CHAMBER | RELEASE CHAMBER | APPLY CHAM. FOR 2nd GEAR | RELEASE CHAM. FOR 3rd GEAR | APPLY CHAM. FOR 4th GEAR | | |
| FIRST GEAR | | | ○ | | | | | (◌) | ◍ |
| SECOND GEAR | | | ○ | | ○ | | | | |
| THIRD GEAR | | ○ | ○ | | ○ | ○ | | | |
| FOURTH GEAR | | ○ | ○ | ○ | ○ | ○ | ○ | | |
| REVERSE | ○ | | | | | | | ○ | |

◍ DURING CRUISING
(◌) DURING ENGINE BRAKE

FIG.5

SHIFT TIMING CONTROL FOR AUTOMATIC TRANSMISSION

BACKGROUND OF THE INVENTION

The present invention relates to a hydraulic control for an automatic transmission and, more particularly, to a shift timing control for an automatic transmission.

A previously proposed hydraulic controls for an automatic transmission is disclosed, for example, in JP-A 58-156757, (equivalent to U.S. Pat. No. 4,563,918). An automatic transmission as described in this Japanese document is of the four forward speeds type, and includes three clutches, two brakes and one one-way clutch for shift control. A low clutch is engaged in first, second, and third gears, whereas a high clutch is engaged in third and fourth gears. A band brake is engaged in second and fourth gears. Accordingly, when the low clutch and the band brake are engaged, second gear is established; when the low clutch and the high clutch are engaged, third gear is established; and, when the high clutch and the band brake are engaged, fourth gear is established. When shifting from fourth gear to third gear, the band brake is released, whereas the low clutch is engaged. In this case, shift timing is adjusted by regulating the buildup of release pressure for releasing the band brake and that of low clutch pressure for engaging the low clutch. When shifting from fourth gear to second gear, the high clutch is released, whereas the low clutch is engaged. In this case, shift timing is adjusted by regulating the fall of high clutch pressure, and the buildup of low clutch pressure. The low clutch includes a single piston, and it is constructed to operated by hydraulic pressure working on the piston on one side thereof, and return by a spring. Accordingly, as working pressure, there is only hydraulic pressure for engaging the low clutch. The band brake includes an apply chamber for engagement and a release chamber for release, and undergoes two working pressures: an apply pressure and a release pressure which are supplied to the two chambers. Accordingly, four working pressures participate with a shift between any two gears of the second, third, and fourth gears. However, only two hydraulic pressures are variable to achieve a shift between any two gears of these gears. Accordingly, at a 4-3 shift and a 4-2 shift, timing of the two hydraulic pressures may be adjusted.

Even with a similar planetary gear train as described in the above Japanese document, however, when a servo unit for controlling the band brake includes three hydraulic chambers, i.e., a second gear apply chamber, a third gear release chamber, and a fourth gear apply chamber, and that the low clutch includes two hydraulic chambers, i.e., a low clutch apply chamber and a low clutch release chamber, six working pressures participate with a shift between any two gears of the second, third, and fourth gears: high clutch release pressure, low clutch apply pressure, low clutch release pressure, band brake second gear apply pressure, band brake third gear release pressure, and band brake fourth gear apply pressure. Particularly, low clutch release pressure changes with band brake fourth gear apply pressure upon a 4-3 shift, and with high clutch pressure upon a 4-2 shift. Accordingly, low clutch release pressure should be adjusted to change not only in a predetermined relationship with band brake fourth gear apply pressure, but in a predetermined relationship with high clutch pressure. The prior art has not proposed means for solving such a problem.

It is, therefore, an object of the present invention to provide a shift timing control for an automatic transmission which allows an appropriate change of low clutch release pressure in a 4-3 shift and a 4-2 shift.

SUMMARY OF THE INVENTION

According to one aspect of the present invention, there is provided, in an automatic transmission:

a first frictional engagement element having a first hydraulic chamber, said first hydraulic chamber being arranged to engage said first frictional engagement element when said first hydraulic chamber undergoes hydraulic pressure;

a second frictional engagement element having a second hydraulic chamber and a third hydraulic chamber, said second hydraulic chamber being arranged to engage said second frictional engagement element when said second hydraulic chamber undergoes hydraulic pressure and when said third hydraulic chamber fails to undergo hydraulic pressure, said third hydraulic chamber being arranged to release said second frictional engagement element regardless of a working state of hydraulic pressure within said second hydraulic chamber when said third hydraulic chamber undergoes hydraulic pressure;

a third frictional engagement element having a fourth hydraulic chamber, a fifth hydraulic chamber and a sixth hydraulic chamber, said fourth hydraulic chamber being arranged to engage said third frictional engagement element when said fourth hydraulic chamber undergoes hydraulic pressure and when said fifth hydraulic chamber fails to undergo hydraulic pressure, said fifth hydraulic chamber being arranged to release said third frictional engagement element regardless of a working state of hydraulic pressure within said fourth hydraulic chamber when said fifth hydraulic chamber undergoes hydraulic pressure and when said sixth hydraulic chamber fails to undergo hydraulic pressure, said sixth hydraulic chamber being arranged to engage said third frictional engagement element when said sixth hydraulic chamber undergoes hydraulic pressure;

means for defining a first drain port;

a first valve having a second drain port; and a second valve disposed between said third hydraulic chamber and said first drain port defining means, said second valve selectively connecting said first hydraulic chamber with said third hydraulic chamber so as to drain off hydraulic fluid within said first and third hydraulic chambers from said first drain port, and said third hydraulic chamber with said sixth hydraulic chamber so as to drain off hydraulic fluid within said third and sixth hydraulic chambers from said second drain port.

According to another aspect of the present invention, there is provided, in an automatic transmission having a first gear, a second gear, a third gear, and fourth gear:

a first frictional engagement element having a first hydraulic chamber, said first hydraulic chamber being arranged to engage said first frictional engagement element when said first hydraulic chamber undergoes hydraulic pressure;

a second frictional engagement element having a second hydraulic chamber and a third hydraulic chamber, said second hydraulic chamber being arranged to engage said second frictional engagement element when said second hydraulic chamber undergoes hydraulic pressure and when said third hydraulic chamber fails to undergo hydraulic pressure, said third hydraulic chamber being arranged to release said second frictional engagement element regardless of a working state of hydraulic pressure within said second hydraulic chamber when said third hydraulic chamber undergoes hydraulic pressure;

a third frictional engagement element having a fourth hydraulic chamber, a fifth hydraulic chamber and a sixth hydraulic chamber, said fourth hydraulic chamber being arranged to engage said third frictional engagement element when said fourth hydraulic chamber undergoes hydraulic pressure and when said fifth hydraulic chamber fails to undergo hydraulic pressure, said fifth hydraulic chamber being arranged to release said third frictional engagement element regardless of a working state of hydraulic pressure within said fourth hydraulic chamber when said fifth hydraulic chamber undergoes hydraulic pressure and when said sixth hydraulic chamber fails to undergo hydraulic pressure, said sixth hydraulic chamber being arranged to engage said third frictional engagement element when said sixth hydraulic chamber undergoes hydraulic pressure, the second gear being established when said second and fourth hydraulic chambers undergo hydraulic pressure and when said first, third, fifth and sixth hydraulic chambers fail to undergo hydraulic pressure, the third gear being established when said first, second, fourth and fifth hydraulic chambers undergo hydraulic pressure and when said third and sixth hydraulic chambers fail to undergo hydraulic pressure, the fourth gear being established when said first, second, third, fourth, fifth and sixth hydraulic chambers undergo hydraulic pressure;

means for defining a first drain port;

a first valve having a second drain port; and a second valve disposed between said third hydraulic chamber and said first drain port defining means, said second valve selectively connecting said first hydraulic chamber with said third hydraulic chamber in the second gear so as to drain off hydraulic fluid within said first and third hydraulic chambers from said first drain port, and said third hydraulic chamber with said sixth hydraulic chamber in the third gear so as to drain off hydraulic fluid within the said third and sixth hydraulic chambers from said second drain port.

DETAILED DESCRIPTION OF THE INVENTION

Referring to the drawings, wherein like reference numerals designate corresponding parts throughout the views, referring particularly to FIGS. 1 to 4, a first preferred embodiment of the present invention will be described.

Figure 2:
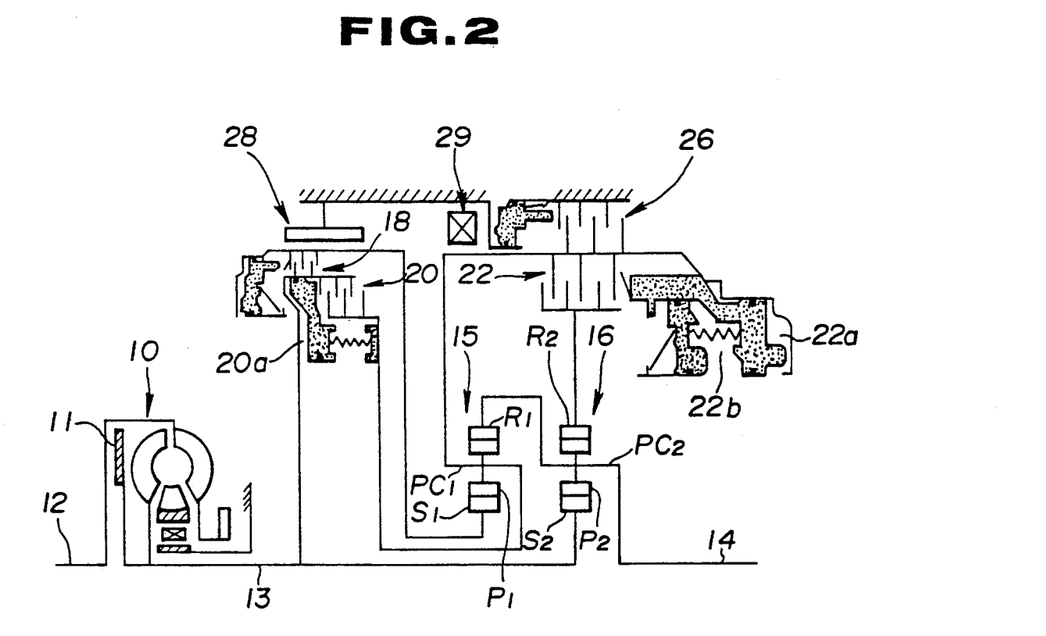
FIG. 2 is a schematic drawing illustrating a power train of an automatic transmission.

FIG. 2 shows a power train of a four forward speeds and one reverse speed automatic transmission with an overdrive. This power train includes an input shaft 13 for receiving torque from an engine output shaft 12 through a torque converter 10, an output shaft 14 for transmitting driving force to a final drive, a first planetary gear set 15, a second planetary gear set 16, a reverse clutch 18, a high clutch (H/C) (first frictional engagement element) 20, a low clutch (L/C) (second frictional engagement element) 22, a low and reverse brake 26, a band brake (third frictional engagement element) 28, and a low one-way clutch 29. The torque converter 10 incorporates a lockup clutch 11. The first planetary gear set 15 includes a sun gear S1, a ring gear R1, pinion gears P1 engaged with the two gears S1 and R1, and a carrier PC1 supporting the pinion gears P1, whereas the planetary gear set 16 includes a sun gear S2, a ring gear R2, pinion gears P2 engaged with the two bears S2 and R2, and a carrier PC2 supporting the pinion gears P2. The carrier PC1 is connectable with the input shaft 13 through the high clutch 20, whereas the sun gear S1 is connectable with the input shaft 13 through the reverse clutch 18. The carrier PC1 is also connectable with the ring gear R2. The sun gear S2 is always connected with the input shaft 13, whereas the ring gear R1 and the carrier PC2 are always connected with the output shaft 14. The low and reverse brake 26 can make the carrier PC1 stationary, whereas the band brake 28 can make the sun gear S1 stationary. The low one-way clutch 29 is arranged in such a direction as to allow a normal rotation (i.e., a rotation in the same direction as that of the engine output shaft 12) of the carrier PC1, but disallow a reverse rotation (i.e., a rotation in a direction opposite to the normal direction) thereof. The high clutch 20, the reverse clutch 18, and the low and reverse brake 26 have one hydraulic chamber on one side of a single piston, and return by a return spring, respectively, whereas the low clutch 22 includes two pistons, thereby defining a low clutch apply chamber (second hydraulic chamber) 22a and a low clutch release chamber (third hydraulic chamber) 22b. If the low clutch apply chamber 22a undergoes hydraulic pressure without any supply of hydraulic pressure to the low clutch release chamber 22b, the low clutch 22 is engaged. On the other hand, if the low clutch release chamber 22b undergoes hydraulic pressure, the low clutch 22 is released even when the low clutch apply chamber 22a undergoes hydraulic pressure.

Figure 3:
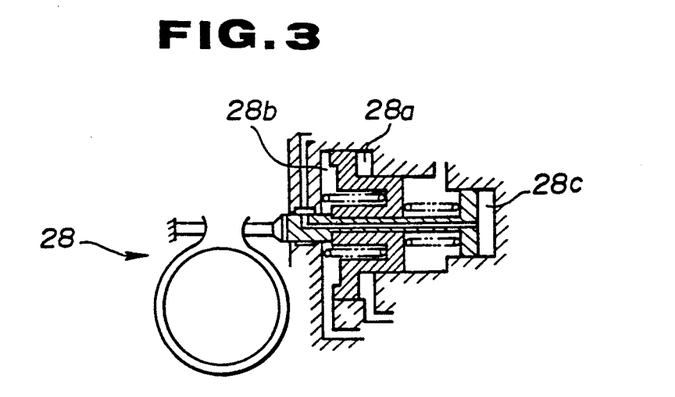
FIG. 3 is a sectional view illustrating a hydraulic servo unit of a band brake.

Referring to FIG. 3, a hydraulic servo unit of the band brake 28 includes three hydraulic chambers defined by two pistons, i.e., a band brake second gear apply chamber (2A) (fourth hydraulic chamber) 28a, a band brake third gear release chamber (3R) (fifth hydraulic chamber) 28b, and a band brake fourth gear apply chamber (4A) (sixth hydraulic chamber) 28c. If the band brake second gear apply chamber 28a undergoes hydraulic pressure without any supply of hydraulic pressure to the band brake fourth gear apply chamber 28b, the band brake 28 is engaged. On the other hand, if the band brake third gear release chamber 28b undergoes hydraulic pressure, the band brake 28 is released regardless of a working state of hydraulic pressure in the band brake second gear apply chamber 28a. If the band brake fourth gear apply chamber 28c undergoes hydraulic pressure, the band brake 28 is engaged regardless of a working state of hydraulic pressure within the band brake second gear apply chamber 28a and the band brake third speed release chamber 28b.

Figure 4:
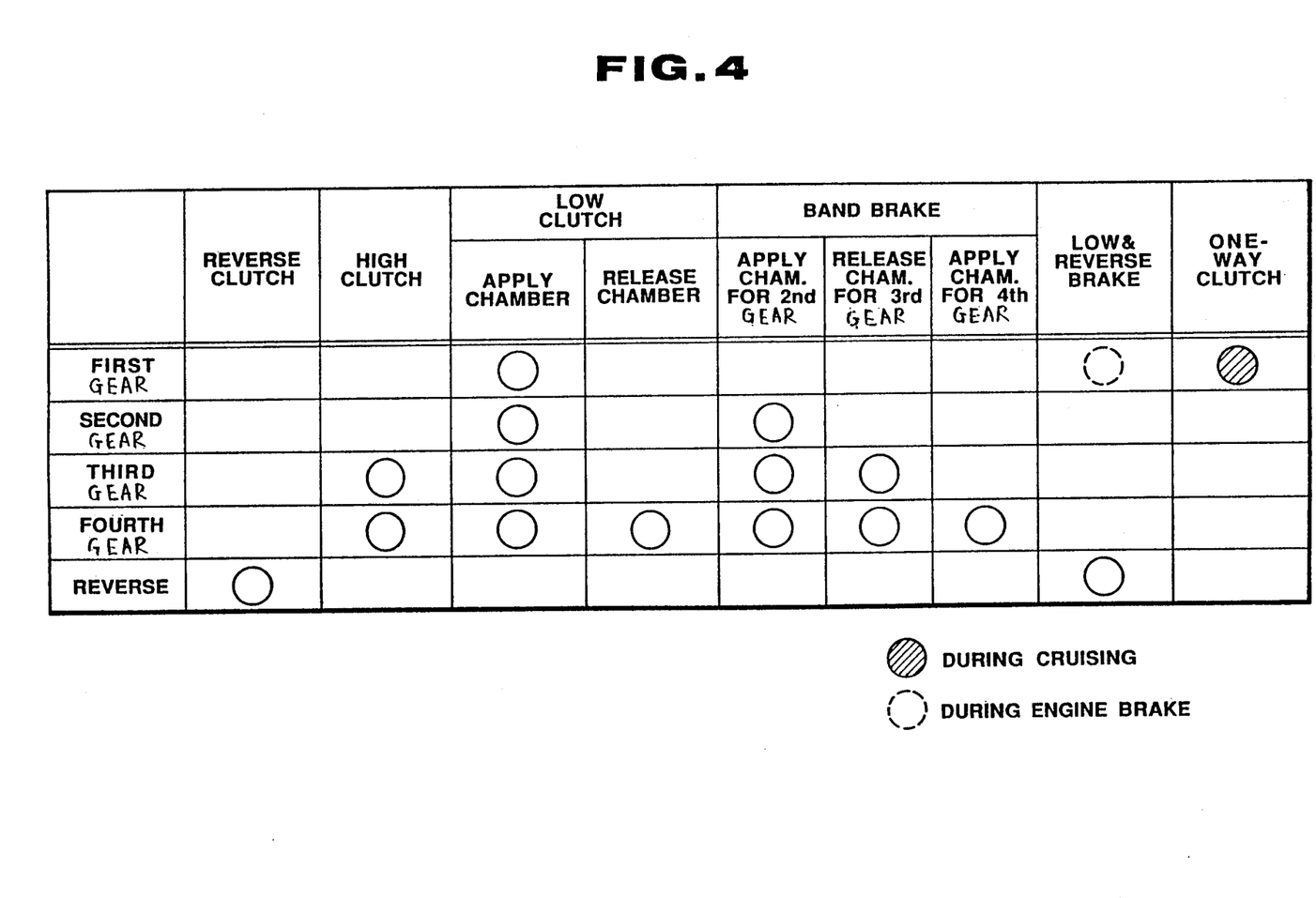
FIG. 4 is a table showing a working state of hydraulic pressure in each hydraulic chamber in each gear.

With the above power train, a rotational state of each element S1, S2, R1, R2, PC1, PC2 of the planetary gear sets 15 and 16 can be changed by operating the clutches 18, 20, 22, and the brakes 26, 28 in different combinations thereof, thus obtaining different rotational speeds of the output shaft 14 relative to that of the input shaft 13. Referring to FIG. 4, four forward speeds and one reverse speed can be obtained by operating the clutches 18, 20, 22, and the brakes 26, 28 in the combinations thereof as shown in FIG. 4. It is to be noted that, in FIG. 4, a cell with a circle designates a hydraulic chamber which undergoes hydraulic pressure.

Figure 1:
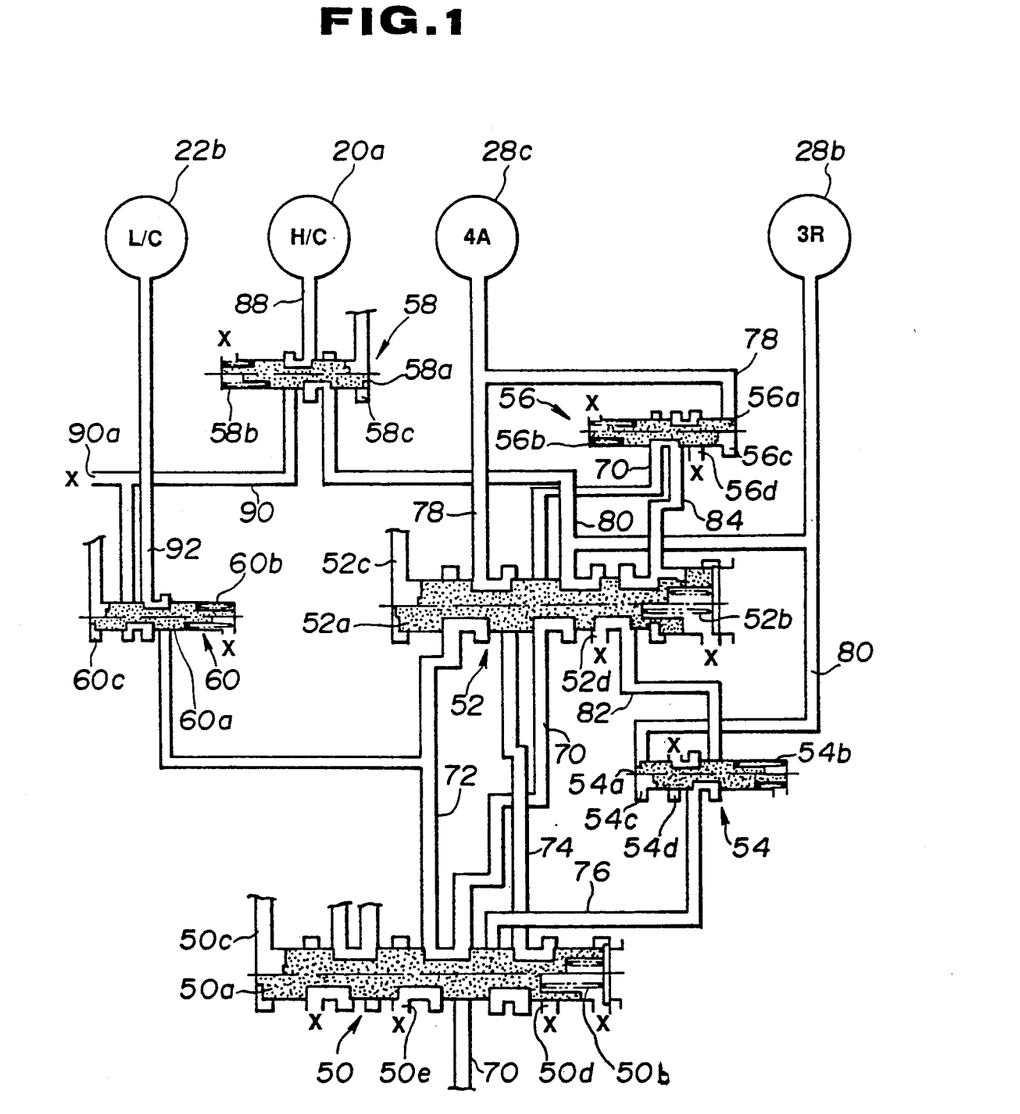
FIG. 1 is a schematic diagram illustrating a hydraulic circuit of a first preferred embodiment of the present invention.

FIG. 1 shows a hydraulic circuit of the first preferred embodiment. It merely illustrates valves directly pertinent to the present invention.

This hydraulic circuit includes a first shift valve (first valve) 50, a second shift valve 52, a 4-2 sequence valve 54, a 4-2 relay valve 56, a high clutch pressure selector valve 58, and a low clutch pressure selector valve (second valve) 60. These are connected with each other as shown in FIG. 1, and also connected with the low clutch release chamber 22b, a high clutch chamber (first hydraulic chamber) 20a, the band brake fourth gear apply chamber 28c, and the band brake third gear release chamber 28c as shown in FIG. 1.

The first shift valve 50 includes a spool 50a and a spring 50b. The spool 50a is movable by a solenoid signal pressure supplied from a port 50c. Specifically, the spool 50a occupies a position as indicated by an upper half thereof in FIG. 1 in first and fourth gears, while it occupies a position as indicated by a lower half thereof in FIG. 1 in second and third gears. According, in first and fourth gears, a hydraulic passage 70 communicates with a hydraulic passage 72, and a hydraulic passage 74 communicates with a drain port 50d. During forward run, the hydraulic passage 70 undergoes hydraulic pressure out of a manual valve (not shown). On the other hand, in second and third gears, the hydraulic passage 72 communicates with a drain port (second drain port) 50e, and the hydraulic passage 74 communicates with a hydraulic passage 76.

The second shift valve 52 includes a spool 52a and a spring 52b. The spool 52a is movable by a solenoid signal pressure other than the above solenoid signal pressure supplied from a port 52c. Specifically, the spool 52a occupies a position as indicated by an upper half thereof in FIG. 1 in first and second gears, while it occupies a position as indicated by a lower half thereof in FIG. 1 in third and fourth gears. Accordingly, in first and second gears, the hydraulic passage 74 is connected with a hydraulic passage 78, and a hydraulic passage 80 is connected with a drain port 52d. Additionally, a hydraulic passage 82 is connected with a hydraulic passage 84. On the other hand, in third and fourth gears, the hydraulic passage 72 is connected with the hydraulic passage 78, and the hydraulic passage 70 is connected with the hydraulic passage 80. Additionally, the hydraulic passage 82 is connected with the drain port 52d. The hydraulic passage 78 communicates with the band brake fourth gear apply chamber 28c. The hydraulic passage 80 communicates with the band brake third gear release chamber 28b.

The 4-2 sequence valve 54 includes a spool 54a and a spring 54b. The spool 54a is movable in response to hydraulic pressure supplied to a port 54c from the hydraulic passage 80. Specifically, when the port 54c undergoes low hydraulic pressure, the spool 54a of the sequence valve 54 occupies a position as indicated by an upper half thereof in FIG. 1, thus connecting the hydraulic passage 76 with a drain port 54d. On the other hand, when the port 54c undergoes high hydraulic pressure, the sequence valve 54 connects the hydraulic passage 76 with the hydraulic passage 82.

The 4-2 relay valve 56 includes a spool 56a and a spring 56b. The spool 56a is movable between a position as indicated by an upper half thereof in FIG. 1 and a position as indicated by a lower half thereof in FIG. 1 in response to hydraulic passage supplied to a port 56c from the hydraulic passage 78. Specifically, when the port 56c undergoes low hydraulic pressure, the relay valve 56 connects the hydraulic passage 84 with a drain port 56d, whereas when the port 56c undergoes high hydraulic pressure, the relay valve 56 connects the hydraulic passage 84 with the hydraulic passage 70.

The high clutch pressure selector valve 58 includes a spool 58a and a spring 58b. The spool 58a is movable between a position as indicated by an upper half thereof in FIG. 1 and a position as indicated by a lower half thereof in FIG. 1 in response to hydraulic pressure supplied to the port 58c. The port 58c undergoes 4-2 shift signal pressure. Accordingly, upon a 4-2 shift, the spool 58a occupies the position as indicated by the upper half thereof in FIG. 1, thus connecting the hydraulic passage 88 with a hydraulic passage 90. On the other hand, upon a 3-2 shift, the hydraulic passage 88 is connected with the hydraulic passage 80. The hydraulic passage 88 communicates with the high clutch chamber 20a. The hydraulic passage 90 is drained from a drain port (first drain port) 90a.

The low clutch pressure selector valve 60 includes a spool 60a and a spring 60b. The spool 60a is movable between a position as indicated by an upper half thereof in FIG. 1 and a position as indicated by a lower half thereof in FIG. 1 in response to hydraulic pressure supplied to a port 60c. The port 60c undergoes signal pressure in third and fourth gears. Accordingly, in third and fourth gears, the spool 60a occupies a position as indicated by an upper half thereof in FIG. 1, thus connecting the hydraulic passage 72 with a hydraulic passage 92. On the other hand, in first and second gears, the selector valve 60 connects the hydraulic passage 92 with the hydraulic passage 90. The hydraulic passage 92 communicates with the low clutch release chamber 22b.

Next, the operation of the first preferred embodiment will be described.

In fourth gear, the spool 50a of the first shift valve 50 occupies the position as indicated by the upper half thereof in FIG. 1, whereas the spool 52a of the second shift valve 52 occupies the position as indicated by the lower half thereof in FIG. 1. Accordingly, the first shift valve 50 connects the hydraulic passage 70 with the hydraulic passage 72, and the second shift valve 52 connects the hydraulic passage 72 with the hydraulic passage 78, thus supplying hydraulic pressure to the band brake fourth gear apply chamber 28c. The second shift valve 52 connects the hydraulic passage 70 with the hydraulic passage 80, thus supplying hydraulic pressure to the band brake third gear release chamber 28b. The spool 58a of the high clutch pressure selector valve 58 occupies the position as indicated by the lower half thereof in FIG. 1, connecting the hydraulic passage 80 with the hydraulic passage 88, thus also supplying hydraulic pressure to the high clutch chamber 20a. On the other hand, the spool 60a of the low clutch pressure selector valve 60 occupies the position as indicated by the upper half thereof in FIG. 1 by signal pressure supplied to the port 60c, connecting the hydraulic passage 72 with the hydraulic passage 92. Accordingly, the low clutch release chamber 22b also undergoes hydraulic pressure. As a result, the low clutch release chamber 22b, the high clutch chamber 20a, the band brake fourth gear apply chamber 28c, and the band brake third gear release chamber 28b all undergo hydraulic pressure. Thus, the high clutch 20 and the band brake 28 are engaged, establishing fourth gear.

When a 4-3 shift is commanded, due to lack of hydraulic pressure supplied to the port 50c of the first shift valve 50, the spool 50a of the shift valve 50 is switched to the position as indicated by the lower half thereof in FIG. 1. As a result, the hydraulic passage 72 is connected with the drain port 50e. Thus, hydraulic fluid within the low clutch release chamber 22b is drained off from the drain port 50e via the hydraulic passage 92, the low clutch pressure selector valve 50, the hydraulic passage 72, and the first shift valve 50. Also, hydraulic fluid within the band brake fourth gear apply chamber 28c is drained off from the drain port 50e via the hydraulic passage 78, the second shift valve 52, the hydraulic passage 72, and the first shift valve 50. Specifically, hydraulic fluid within the low clutch release chamber 22b and that one within the band brake fourth gear apply chamber 28c are drained off from the common drain port 50e, and reduced with the same speed, thus releasing the band brake 28 and engaging the low clutch 22. As described above, since hydraulic fluid within the low clutch release chamber 22b and that one within the band brake fourth gear apply chamber 28c are drained off from the common drain port 50e, release of the band brake 28 and engagement of the low clutch 22 are carried out synchronously. Additionally, this synchronism is maintained regardless of cruising conditions.

When a 4-2 shift is commanded, in parallel with a switching of the spool 50a of the first shift valve 50, the spool 52a of the second shift valve 52 is switched from the position as indicated by the lower half thereof in FIG. 1 to the upper half thereof in FIG. 1. As a result, the hydraulic passage 80 is connected with the drain port 52d. Thus, hydraulic fluid as supplied to the band brake third gear release chamber 28b is drained off from the drain port 52d. Due to lack of signal pressure supplied to the port 60c of the low clutch pressure selector valve 60, the spool 60c of the low clutch pressure selector valve 60 is switched to the position as indicated by the lower half thereof in FIG. 1. Additionally, since the port 58c of the high clutch pressure selector valve 58 undergoes 4-2 signal pressure, the spool 58a of the high clutch pressure selector valve 58 is switched to the position as indicated by the upper half thereof in FIG. 1. Accordingly, the hydraulic passage 92 is connected with the hydraulic passage 90 by the low clutch pressure selector valve 60, whereas the hydraulic passage 88 is connected with the hydraulic passage 90 by the high clutch pressure selector valve 58. Hydraulic fluid within the hydraulic passage 90 is drained off from the drain port 90a. As a result, hydraulic fluid within the low clutch release chamber 22b and within the high clutch chamber 20a are drained off from the common drain port 90a, and reduced synchronously. That is, release of the high clutch 20 and engagement of the low clutch 22 are carried out synchronously.

Upon a 4-2 shift, hydraulic pressure within the band brake fourth gear apply chamber 28c is reduced as follows: Since the spool 54a of the 4-2 sequence valve 54 is held in the position as indicated by the lower half thereof in FIG. 1 before sufficient reduction of hydraulic pressure within the hydraulic passage 80, the 4-2 sequence valve 54 connects the hydraulic passage 76 with the hydraulic passage 82. On the other hand, the spool 54a of the 4-2 relay valve 56 is in the position as indicated by the lower half thereof in FIG. 1. Accordingly, the hydraulic passage 70 is connected with the hydraulic passage 84. As a result, the band brake fourth gear apply chamber 28c undergoes hydraulic pressure out of the hydraulic passage 70 via the 4-2 relay valve 56, the hydraulic passage 84, the second shift valve 52, the hydraulic passage 82, the 4-2 sequence valve 54, the hydraulic passage 76, the first shift valve 50, the hydraulic passage 74, the second shift valve 52, and the hydraulic passage 78, thus holding engagement of the band brake 28, i.e., fourth gear. When hydraulic pressure within the band brake third gear release chamber 28b is reduced with development of shifting, the port 54c of the 4-2 sequence valve 54 undergoes reduced hydraulic pressure, and the spool 54a of the 4-2 sequence valve 54 is thus switched to the position as indicated by the upper half thereof in FIG. 1. As a result, the hydraulic passage 76 is connected with the drain port 54d, draining off hydraulic fluid within the band brake fourth gear apply chamber 28c from the drain port 54d via the hydraulic passage 78, the second shift valve 52, the hydraulic passage 74, the first shift valve 50, the hydraulic passage 76, and the 4-2 sequence valve 54. Thus, engagement of the band brake 28 is held by hydraulic pressure within the band brake fourth gear apply chamber 28c. Specifically, since hydraulic pressure within the band brake fourth gear apply chamber 28c is reduced after a decrease in hydraulic pressure within the band brake third gear release chamber 28b, shifting is carried out directly from fourth gear to second gear without release of the band brake 28 during shifting.

Next, a 3-2 shift will be described for reference. In third gear, the spool 50a of the first shift valve 50 is in the position as indicated by the lower half thereof in FIG. 1, whereas the spool 52a of the second shift valve 52 is in the position as indicated by the lower half thereof in FIG. 1. Thus, the low clutch release chamber 22b, the high clutch chamber 20a, and the band brake third gear release chamber 28b undergo hydraulic pressure. In this state, if the spool 52a of the second shift valve 52 is switched to the position as indicated by the upper half thereof in FIG. 1, hydraulic fluid within the band brake third gear release chamber 28b is drained off from the drain port 52d via the hydraulic passage 80 and the second shift valve 52. Also, hydraulic fluid within the high clutch chamber 20a is drained off from the drain port 52d via the hydraulic passage 88, the high clutch pressure selector valve 58, the hydraulic passage 80, and the second shift valve 52. In this case, also, hydraulic fluid within the high clutch chamber 20a and the band brake third gear release chamber 28b is drained off from the common drain port 52d, and release of the high clutch 20 and engagement of the band brake 28 are carried out synchronously.

In the first preferred embodiment, there are neither an orifice nor an accumulator. If the drain port 50e is constructed to have an orifice, for example, the common orifice effect can be obtained for drainage of hydraulic fluid within the low clutch release chamber 22b and the band brake fourth gear apply chamber 28c. Additionally, if an accumulator is arranged to the hydraulic passage 72, for example, change in hydraulic pressure within both the low clutch release chamber 22b and the band brake fourth gear apply chamber 28c can be moderated. The same effect can be obtained when the orifice and the accumulator are arranged to the hydraulic passage 90.

Figure 5:
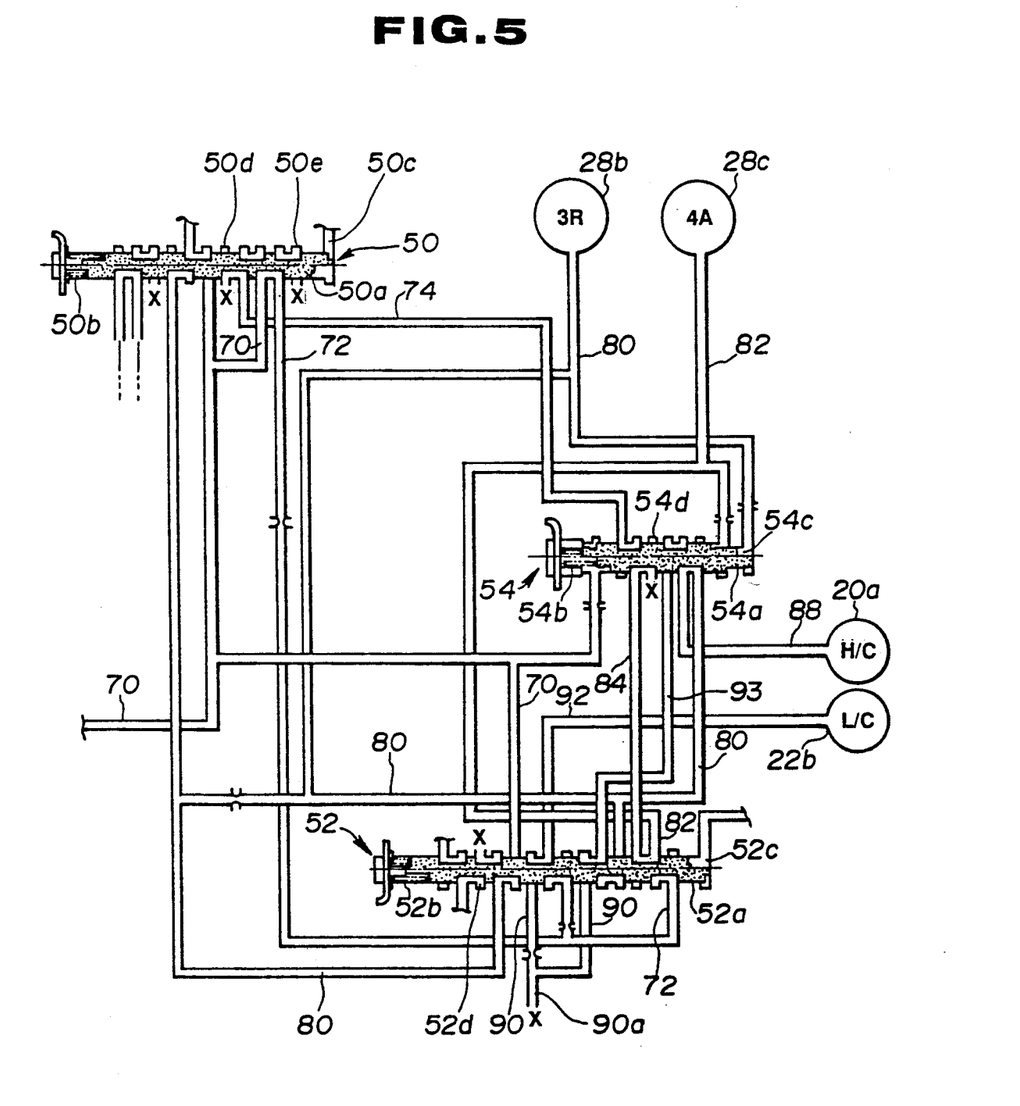
FIG. 5 is a view similar to FIG. 1, illustrating a hydraulic circuit of a second preferred embodiment of the present invention.

Referring to FIG. 5, a second preferred embodiment of the present invention will be described.

FIG. 5 shows a hydraulic circuit of the second preferred embodiment. It merely illustrates valves directly pertinent to the present invention.

This hydraulic circuit includes a first shift valve (first valve) 50, a second shift valve (second valve) 52, and a 4-2 sequence valve 54. These are connected with each other as shown in FIG. 5, and also connected with a low clutch release chamber (third hydraulic chamber) 22b, a high clutch chamber (first hydraulic chamber) 20a, a band brake fourth gear apply chamber 28c, and a band brake third gear release chamber 28c as shown in FIG. 5.

The first shift valve 50 includes a spool 50a and a spring 50b. The spool 50a is movable by a solenoid signal pressure supplied from a port 50c. Specifically, the spool 50a occupies a position as indicated by an upper half thereof in FIG. 5 in first and fourth gears, while it occupies a position as indicated by a lower half thereof in FIG. 5 in second and third gears. Accordingly, in first and fourth gears, a hydraulic passage 70 communicates with a hydraulic passage 72, and a hydraulic passage 74 communicates with a drain port 50d. During a forward run, the hydraulic passage 70 undergoes hydraulic pressure out of a manual valve (not shown). On the other hand, in second and third gears, the hydraulic passage 72 communicates with a drain port (second drain port) 50e, and the hydraulic passage 74 communicates with a hydraulic passage 70.

The second shift valve 52 includes a spool 52a and a spring 52b. The spool 52a is movable by a solenoid signal pressure other than the above solenoid signal pressure supplied from a port 52c. Specifically, the spool 52a occupies a position as indicated by an upper half thereof in FIG. 5 in first and second gears, while it occupies a position as indicated by a lower half thereof in FIG. 5 in third and fourth gears. Accordingly, in first and second gears, a hydraulic passage 92 is connected with a hydraulic passage 90, and a hydraulic passage 93 is connected with the hydraulic passage 90. Additionally, a hydraulic passage 82 is connected with the hydraulic passage 84, and a hydraulic passage 80 is connected with a drain port 52d. On the other hand, in third and fourth gears, the hydraulic passage 72 is connected with the hydraulic passage 82, and the hydraulic passage 70 is connected with the hydraulic passage 80. Additionally, the hydraulic passage 80 is connected with the hydraulic passage 93, and the hydraulic passage 72 is connected with the hydraulic passage 92. The hydraulic passage 82 communicates with the band brake fourth gear apply chamber 28c. The hydraulic passage 80 communicates with the band brake third gear release chamber 28b. The hydraulic passage 92 communicates with the low clutch release chamber 22b. The hydraulic passage 90 is drained from a drain port (first drain port) 90a.

The 4-2 sequence valve 54 includes a spool 54a and a spring 54b. The spool 54a is movable in response to hydraulic pressure supplied to a port 54c from the hydraulic passage 80. Specifically, when the port 54c undergoes low hydraulic pressure, the spool 54a of the sequence valve 54 occupies a position as indicated by an upper half thereof in FIG. 5, thus connecting the hydraulic passage 84 with a drain port 54d, and also connecting the hydraulic passage 88 with the hydraulic passage 93. The hydraulic passage 88 communicates with the high clutch chamber 20a.

Next, the operation of the second preferred embodiment will be described.

In fourth gear, the spool 50a of the first shift valve 50 occupies the position as indicated by the lower half thereof in FIG. 5, whereas the spool 52a of the second shift valve 52 occupies the position as indicated by the lower half thereof in FIG. 5. Accordingly, the first shift valve 50 connects the hydraulic passage 70 with the hydraulic passage 72, and the second shift valve 52 connects the hydraulic passage 72 with the hydraulic passage 82, thus supplying hydraulic pressure to the band brake fourth gear apply chamber 28c. The second shift valve 52 connects the hydraulic passage 70 with the hydraulic passage 80, thus supplying hydraulic pressure to the band brake third gear release chamber 28b. The spool 54a of the 4-2 sequence valve 54 occupies the position as indicated by the upper half thereof in FIG. 5, connecting the hydraulic passage 88 which communicate with the high clutch chamber 28b with the hydraulic passage 93. The second shift valve 52 connects the hydraulic passage 93 with the hydraulic passage 80. Thus, the high clutch chamber 20a also undergoes hydraulic pressure. On the other hand, the second shift valve 52 connects the hydraulic passage 72 with the hydraulic passage 92. Accordingly, the low clutch release chamber 22b also undergoes hydraulic pressure.

As a result, all the low clutch release chamber 22b, the high clutch chamber 20a, the band brake fourth gear apply chamber 28c, and the band brake third gear release chamber 28b undergo hydraulic pressure. Thus, the high clutch 20 and the band brake 28 are engaged, establishing fourth gear.

When a 4-3 shift is commanded, due to lack of hydraulic pressure supplied to the port 50c of the first shift valve 50, the spool 50a of the shift valve 50 is switched to the position as indicated by the upper half thereof in FIG. 1. As a result, the hydraulic passage 72 is connected with the drain port 50e. Thus, hydraulic fluid within the low clutch release chamber 22b is drained off from the drain port 50e via the hydraulic passage 92, the second shift valve 52, the hydraulic passage 72, and the first shift valve 50. Also, hydraulic fluid within the band brake fourth gear apply chamber 28c is drained off from the drain port 50e via the hydraulic passage 82, the second shift valve 52, the hydraulic passage 72, and the first shift valve 50. Specifically, hydraulic fluid within the low clutch release chamber 22b and that one within the band brake fourth gear apply chamber 28c are drained off from the common drain port 50e, and reduced with the same speed, thus releasing the band brake 28 and engaging the low clutch 22. As described above, since hydraulic fluid within the low clutch release chamber 22b and that one within the band brake fourth gear apply chamber 28c are drained off from the common drain port 50e, release of the band brake 28 and engagement of the low clutch 22 are carried out synchronously. Additionally, this synchronism is maintained regardless of cruising conditions.

When a 4-2 shift is commanded, in parallel with a switching of the spool 50a of the first shift valve 50, the spool 52a of the second shift valve 52 is switched from the position as indicated by the lower half thereof in FIG. 1 to the upper half thereof in FIG. 1. As a result, the hydraulic passage 80 is connected with the drain port 52d. Thus, hydraulic fluid as supplied to the band brake third gear release chamber 28b is drained off from the drain port 52d. Hydraulic fluid within the low clutch release chamber 22b is drained off from the drain port 90a via the hydraulic passage 92, the second shift valve 52, and the hydraulic passage 90. Additionally, hydraulic fluid within the high clutch chamber 20a is drained off from the drain port 90a via the hydraulic passage 88, the 4-2 sequence valve 54, the hydraulic passage 93, the second shift valve 52, and the hydraulic passage 90. As a result, hydraulic fluid within the low clutch release chamber 22b and that one within the high clutch chamber 20a are drained off from the common drain port 90a, and reduced synchronously. That is, release of the high clutch 20 and engagement of the low clutch 22 are carried out synchronously.

Upon a 4-2 shift, hydraulic pressure within the band brake fourth gear apply chamber 28c is reduced as follows: Since the spool 54a of the 4-2 sequence valve 54 is held in the position as indicated by the upper half thereof in FIG. 5 before sufficient reduction of hydraulic pressure within the hydraulic passage 80, the 4-2 sequence valve 54 connects the hydraulic passage 74 with the hydraulic passage 84. On the other hand, the spool 50a of the first shift valve 50 is in the position as indicated by the upper half thereof in FIG. 5. Accordingly, the hydraulic passage 70 is connected with the hydraulic passage 74. As a result, the band brake fourth gear apply chamber 28c undergoes hydraulic pressure out of the hydraulic passage 70 via the first shift valve 50, the hydraulic passage 74, the 4-2 sequence valve 54, the hydraulic passage 84, the second shift valve 52, and the hydraulic passage 82, thus holding engagement of the band brake 28, i.e., fourth gear. When hydraulic pressure within the band brake third gear release chamber 28b is reduced with development of shifting, the port 54c of the 4-2 sequence valve 54 undergoes reduced hydraulic pressure, and the spool 54a of the 4-2 sequence valve 54 is thus switched to the position as indicated by the lower half thereof in FIG. 5. As a result, the hydraulic passage 84 is connected with the drain port 54d, draining off hydraulic fluid within the band brake fourth gear apply chamber 28c from the drain port 54d via the hydraulic passage 82, the second shift valve 52, the hydraulic passage 84, and the 4-2 sequence valve 54. Thus, engagement of the band brake 28 is held by hydraulic pressure within the band brake fourth gear apply chamber 28c. Specifically, since hydraulic pressure within the band brake fourth gear apply chamber 28c is reduced after decrease in hydraulic pressure within the band brake third gear release chamber 28b, shifting is carried out directly from fourth gear to second gear without release of the band brake 28 during shifting.

Next, a 3-2 shift will be described for reference. In third gear, the spool 50a of the first shift valve 50 is in the position as indicated by the upper half thereof in FIG. 5, whereas the spool 52a of the second shift valve 52 is in the position as indicated by the lower half thereof in FIG. 5. Thus, the low clutch release chamber 22b, the high clutch chamber 20a, and the band brake third gear release chamber 28b undergo hydraulic pressure. In this state, if the spool 52a of the second shift valve 52 is switched to the position as indicated by the upper half thereof in FIG. 5, hydraulic fluid within the band brake third gear release chamber 28b is drained off from the drain port 52d via the hydraulic passage 80 and the second shift valve 52. Also, hydraulic fluid within the high clutch chamber 20a is drained off from the drain port 52d via the hydraulic passage 88, the 4-2 sequence valve 54, the hydraulic passage 80, and the second shift valve 52. In this case, also, hydraulic fluid within the high clutch chamber 20a and the band brake third gear release chamber 28b is drained off from the common drain port 52d, and release of the high clutch 20 and engagement of the band brake 28 are carried out synchronously.

What is claimed is:

1. In an automatic transmission:

a first frictional engagement element having a first hydraulic chamber, said first hydraulic chamber being arranged to engage said first frictional engagement element when said first hydraulic chamber undergoes hydraulic pressure;

a second frictional engagement element having a second hydraulic chamber and a third hydraulic chamber, said second hydraulic chamber being arranged to engage said second frictional engagement element when said second hydraulic chamber undergoes hydraulic pressure and when said third hydraulic chamber fails to undergo hydraulic pressure, said third hydraulic chamber being arranged to release said second frictional engagement element regardless of a working state of hydraulic pressure within said second hydraulic chamber when said third hydraulic chamber undergoes hydraulic pressure;

a third frictional engagement element having a fourth hydraulic chamber, a fifth hydraulic chamber and a sixth hydraulic chamber; said fourth hydraulic chamber being arranged to engage said third frictional engagement element when said fourth hydraulic chamber undergoes hydraulic pressure and when said fifth hydraulic chamber fails to undergo hydraulic pressure, said fifth hydraulic chamber being arranged to release said third frictional engagement element regardless of a working state of hydraulic pressure within said fourth hydraulic chamber when said fifth hydraulic chamber undergoes hydraulic pressure and when said sixth hydraulic chamber fails to undergo hydraulic pressure, said sixth hydraulic chamber being arranged to engage said third frictional engagement element when said sixth hydraulic chamber undergoes hydraulic pressure;

means for defining a first drain port;

a first valve having a second drain port; and a second valve disposed between said third hydraulic chamber and said first drain port defining means, said second valve selectively connecting said first hydraulic chamber with said third hydraulic chamber so as to drain off hydraulic fluid within said first and third hydraulic chambers from said first drain port, said second valve selectively connecting said third hydraulic chamber with said sixth hydraulic chamber so as to drain off hydraulic fluid within said third and sixth hydraulic chambers from said second drain port.

2. An automatic transmission as claimed in claim 1, wherein said second valve includes a selector valve.

3. An automatic transmission as claimed in claim 1, wherein said second valve includes a shift valve.

4. An automatic transmission as claimed in claim 1, wherein said second valve takes a first position wherein said third hydraulic chamber communicates with said first drain port, and a second position wherein said third hydraulic chamber communicates with said second drain port.

5. In an automatic transmission having a first gear, a second gear, a third gear, and a fourth gear:
a first frictional engagement element having a first hydraulic chamber, said first hydraulic chamber being arranged to engage said first frictional engagement element when said first hydraulic chamber undergoes hydraulic pressure;
a second frictional engagement element having a second hydraulic chamber and a third hydraulic chamber, said second hydraulic chamber being arranged to engage said second frictional engagement element when said second hydraulic chamber undergoes hydraulic pressure and when said third hydraulic chamber fails to undergo hydraulic pressure, said third hydraulic chamber being arranged to release said second frictional engagement element regardless of a working state of hydraulic pressure within said second hydraulic chamber the hydraulic chamber undergoes hydraulic pressure;
a third frictional engagement element having a fourth hydraulic chamber, a fifth hydraulic chamber and a sixth hydraulic chamber, said fourth hydraulic chamber being arranged to engage said third frictional engagement element when said fourth hydraulic chamber undergoes hydraulic pressure and when said fifth hydraulic chamber fails to undergo hydraulic pressure, said fifth hydraulic chamber being arranged to release said third frictional engagement element regardless of a working state of hydraulic pressure within said fourth hydraulic chamber when said fifth hydraulic chamber undergoes hydraulic pressure and when said sixth hydraulic chamber fails to undergo hydraulic pressure, said sixth hydraulic chamber being arranged to engage said third frictional engagement element when said sixth hydraulic chamber undergoes hydraulic pressure,
the second gear being established when said second and fourth hydraulic chambers undergo hydraulic pressure and when said first, third, fifth and sixth hydraulic chambers fail to undergo hydraulic pressure, the third gear being established when said first, second, fourth and fifth hydraulic chamber undergo hydraulic pressure and when said third and sixth hydraulic chamber fail to undergo hydraulic pressure, the fourth gear being established when said first, second, third, fourth, fifth and sixth hydraulic chambers undergo hydraulic pressure;
means for defining a first drain port;
a first valve having a second drain port; and
a second valve disposed between said third hydraulic chamber and said first drain port defining means, said second valve selectively connecting said first hydraulic chamber with said third hydraulic chamber in the second gear so as to drain off hydraulic fluid within said first and third hydraulic chambers from said first drain port, said second valve selectively connecting said third hydraulic chamber with said sixth hydraulic chamber in the third gear so as to drain off hydraulic fluid within the said third and sixth hydraulic chambers from said second drain port.

6. An automatic transmission as claimed in claim 5, wherein said second valve includes a selector valve.

7. An automatic transmission as claimed in claim 5, wherein said second valve includes a shift valve.

8. An automatic transmission as claimed in claim 5, wherein said second valve takes a first position wherein said third hydraulic chamber communicates with said first drain port, and a second position wherein said third hydraulic chamber communicates with said second drain port.

* * * * *